No. 856,927. PATENTED JUNE 11, 1907.
E. E. STRAW.
TONSILLOTOME.
APPLICATION FILED JULY 26, 1906.
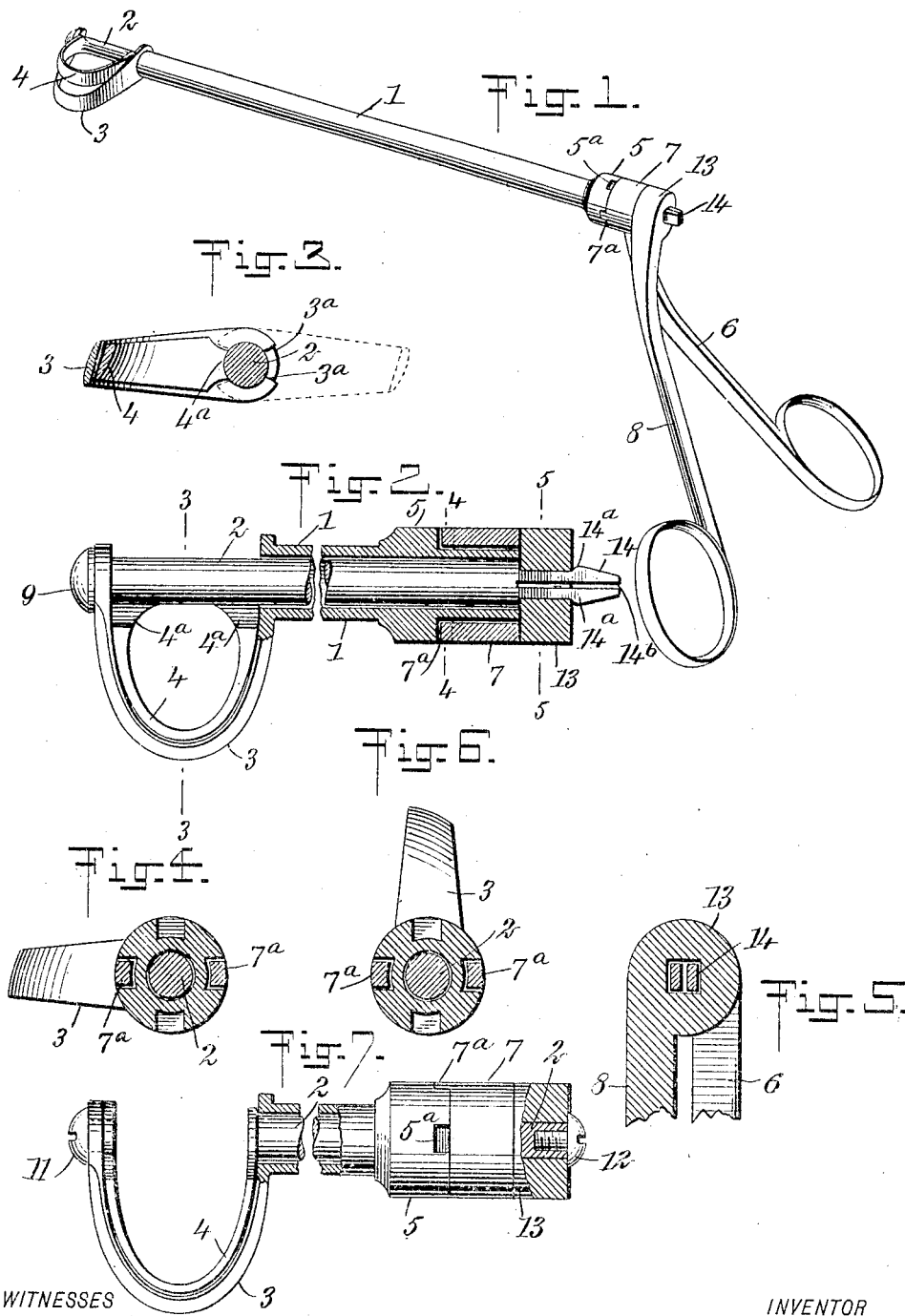
WITNESSES
INVENTOR
Edwin E. Straw
BY
ATTORNEYS

UNITED STATES PATENT OFFICE.

EDWIN E. STRAW, OF MARSHFIELD, OREGON.

TONSILLOTOME.

No. 856,927.  Specification of Letters Patent.  Patented June 11, 1907.

Application filed July 26, 1906. Serial No. 327,861.

*To all whom it may concern:*

Be it known that I, EDWIN E. STRAW, a citizen of the United States, and a resident of Marshfield, in the county of Coos and State of Oregon, have invented a new and Improved Tonsillotome, of which the following is a full, clear, and exact description.

My invention relates to surgical scissors known as a tonsillotome, especially adapted to be used for operating on the tonsils of a patient without danger of injury to the faucial pillars of the throat, and has for its object to provide cutting blades adapted to remove any desired amount of tissue at a single cut, to provide means for adjusting the cutting blades at any desired angle relatively to the handles operating the blades, and also to provide means for detaching one blade from the other. This I accomplish by the means illustrated in the accompanying drawings, in which drawing like characters of reference indicate like parts throughout the views, and in which Figure 1 is a perspective view of a device embodying my invention; Fig. 2 is a central longitudinal section of the device shown in Fig. 1 partly broken away, showing the cutting blades in side elevation; Fig. 3 is a transverse section taken on the line 3—3 of Fig. 2; Fig. 4 is a transverse section taken on the line 4—4 of Fig. 2; Fig. 5 is a transverse section taken on the line 5—5 of Fig. 2; Fig. 6 is a transverse section taken on the line 4—4 of Fig. 2, showing the cutting blades arranged in a vertical plane; and Fig. 7 is a side elevation of a modification of my invention, partly broken away.

As illustrated in the drawings, 1 represents an elongated tubular shaft having a cutting blade 3 mounted on its end. An inner shaft 2 preferably solid in construction is journaled in the tubular shaft 1, and is provided on its end with a cutting blade 4 similar in general construction to the cutting blade 3. The end of the outer cutting blade 3 is provided with a recess $3^a$ and the end portions of the inner blade are reduced to form ribs $4^a$ adapted to pass through the recess $3^a$ of the cutting blade 3, when the blades are arranged on opposite sides of the shaft 2, as indicated in Fig. 3, whereby the inner shaft 2 may be withdrawn from the tubular shaft 1 and the cutting blades detached from each other. The cutting blades are held in position when in use by means of a screw pin 9 which engages the end of the inner shaft 2. The cutting blades are preferably curved lengthwise longitudinally throughout their entire length, and are inclined transversely so that the blades may bind at their cutting edges when moving in the arc of a circle. This transverse inclination of the cutting blades may extend in a curved or a straight line, and if desired the side portions of the blades may be arranged parallel with each other and the blades curved longitudinally only between said side portions. I prefer, however, to curve the blades throughout their entire length. The posterior end of the tubular shaft 1 is provided with a boss 5 having recesses $5^a$ adapted to engage projections $7^a$ formed on a hub 7 having a handle 6 attached thereto. The hub 7 of this handle is mounted upon the end of the tubular shaft 1, and by means of the recesses $5^a$ in the hub 5 of the tubular shaft and the engaging projections $7^a$ of the hub 7 of the handle, the handle is provided with a rotary locking adjustment on the shaft 1, whereby the cutting blades may be arranged in a plane at right angles to the plane of the handles and to the right or the left of the bars upon which they are mounted. The other member 8 of the handles is detachably secured to the inner shaft 2 preferably by reducing the posterior end of such shaft and providing it with a slot $14^b$ forming a spring key, having shoulders $14^a$ adapted to lock the hub 13 formed on the handle 8 securely in position on the end of the inner shaft 2. The handle 8 may readily be removed from the slotted end or tang of the inner shaft by compressing the extremities of the tang, thereby enabling the handle 8 to be readily adjusted at any desired angle with the cutting blades.

By means of such construction the handles may be at all times held in a position most convenient for the operator without obstructing his view of the cutting blades and the parts to be operated upon, and at the same time permit the cutting blades to be arranged horizontally to the right or left of their supporting shafts or above or below said shafts so as to be in convenient relation to the parts to be operated upon.

I do not desire to be limited to the specific construction of the parts already described, as other means having similar capabilities may be used without departing from my invention. Thus instead of extending the inner shaft outward to the outer extremity of the outer blade 3, as shown in Fig. 1, the inner shaft 2 may terminate at the inner end of the outer blade and be connected with but one end of the inner blade, as shown in Fig. 7. The outer ends of the blades may then be secured together by means of a screw pin 11. When such construction is used the outer end of the blade 3 is provided with the same kind of a slot as shown in Fig. 3, and the outer end of the inner blade reduced so as to pass through said slot. And instead of having the posterior end of the inner shaft constructed in the form of a slotted tang, a stud pin 12 may be secured to such end of the shaft 2 by means of a threaded engagement, as indicated in Fig. 7.

Having thus described my invention, what I claim as new and desire to secure by Letters Patent is:

1. A tonsillotome comprising an elongated tubular shaft having an inner shaft journaled therein, cutting blades secured to said shafts curved longitudinally and inclined transversely, and handles arranged at an angle to said shafts and rotatably adjustable thereon, substantially as shown and described.

2. A tonsillotome comprising an elongated tubular shaft having a cutting blade secured thereto, curved longitudinally and inclined transversely, an inner shaft journaled in the tubular shaft and provided with a cutting blade, curved longitudinally and inclined transversely, and handles arranged at an angle to said shaft, one member having a rotary locking adjustment on the outer shaft and the other member being adjustably secured to the inner shaft, substantially as shown and described.

3. A tonsillotome comprising an outer tubular shaft having attached thereto a cutting blade, curved longitudinally and inclined transversely at its central portion, and provided on its end with a recess, an inner shaft journaled in the tubular shaft having a cutting blade, curved longitudinally and inclined transversely at its central portion, and adapted at its end to pass through the recess on the end of the opposite blades and handles arranged at an angle to said shafts, one member having a rotary locking adjustment on the outer shaft and the other member being adjustably secured to the inner shaft, substantially as shown and described.

4. In a tonsillotome, the combination with an outer tubular shaft provided on one end with a boss having recesses formed therein, of a cutting blade secured to the opposite end of said shaft, curved longitudinally and inclined transversely at its central portion, an inner shaft journaled in the tubular shaft, an inner cutting blade secured to said shaft, and curved longitudinally and inclined transversely at its central portion, a handle mounted upon the end of the tubular shaft and provided with projections adapted to engage the recesses formed in the hub of said shaft, and a handle detachably secured to the end of the inner shaft, substantially as shown and described.

5. In a tonsillotome, the combination with an elongated tubular shaft provided on one end with a recessed boss, of a cutting blade secured to the opposite end of said shaft, curved longitudinally and inclined transversely at its central portion, an inner shaft having one of its ends slotted and provided with a shoulder to form a spring key, a cutting blade secured to the opposite end of said shaft, curved longitudinally and inclined transversely at its central portions a handle provided with a hub having projections adapted to engage the recesses of the hub of the outer shaft, and a handle detachably secured to the end of the inner shaft, substantially as shown and described.

6. In a tonsillotome, the combination with an elongated tubular shaft provided on one end with a boss having recesses formed therein, of a cutting blade secured to the opposite end of said shaft, curved longitudinally and inclined transversely at its central portion, an inner shaft having one of its ends engaging the outer end of the blade secured to the tubular shaft, a cutting blade secured to the end of said shaft, curved longitudinally and inclined transversely at its central portion, a handle having a rotating locking engagement with one end of the tubular shaft, and a handle detachably secured to one end of the inner shaft, substantially as shown and described.

In testimony whereof I have signed my name to sis specification in the presence of two subscribing witnesses.

EDWIN E. STRAW.

Witnesses:
JOHN S. COKE,
CLAUDE NASBURG.